United States Patent
Togawa

[11] Patent Number: 5,491,679
[45] Date of Patent: Feb. 13, 1996

[54] INFORMATION RECORDING AND/OR REPRODUCING APPARATUS WITH SHUTTER MEMBER AND SHUTTLE LINKED FOR MOVEMENT TOGETHER

[75] Inventor: Tsuyoshi Togawa, Hino, Japan

[73] Assignee: Olympus Optical Co., Ltd., Tokyo, Japan

[21] Appl. No.: 106,947

[22] Filed: Aug. 17, 1993

[30] Foreign Application Priority Data

Aug. 19, 1992 [JP] Japan .................................... 4-220231

[51] Int. Cl.⁶ ............................ G11B 33/02; G11B 17/04
[52] U.S. Cl. ................... 369/77.2; 360/99.06; 360/99.02
[58] Field of Search ............................. 369/77.2, 77.1; 360/99.06, 99.07, 99.02, 99.03; 235/483

[56] References Cited

U.S. PATENT DOCUMENTS

| | | | |
|---|---|---|---|
| 4,592,039 | 5/1986 | Toyoguchi et al. | 369/77.1 |
| 4,691,257 | 9/1987 | Taguchi | 369/77.2 |
| 4,731,775 | 3/1988 | Katsuyama et al. | 369/77.2 |
| 4,797,761 | 1/1989 | Cocco | 369/77.2 |
| 5,220,552 | 6/1993 | Yoki et al. | 369/77.2 |

FOREIGN PATENT DOCUMENTS

| | | |
|---|---|---|
| 61-37103 | 10/1986 | Japan . |
| 63-78361 | 5/1988 | Japan . |
| 465 | 1/1992 | Japan . |
| 415757 | 2/1992 | Japan . |

*Primary Examiner*—Stuart S. Levy
*Assistant Examiner*—William R. Korzuch
*Attorney, Agent, or Firm*—Stevens, Davis, Miller & Mosher

[57] ABSTRACT

An apparatus for recording and/or reproducing information on and/or from a record medium such as an optical card includes a card insertion opening, a shutter member arranged rotatably for selectively closing the card insertion opening, a shuttle for supporting the optical card and being movable in a first direction with respect to an optical head, a first driving motor for moving the shuttle between a loading position and a read/write position, and a second driving motor for moving the optical card onto and from the shuttle. The shutter member is moved in conjunction with the movement of the shuttle by providing a link member having a first engaging portion which is engaged with the shuttle member when the shuttle is in the loading position and a second engaging portion which is engaged with the shutter member to move the shutter member such that the card insertion opening is opened to allow the insertion and discharge of the optical card into and from the shuttle.

5 Claims, 8 Drawing Sheets

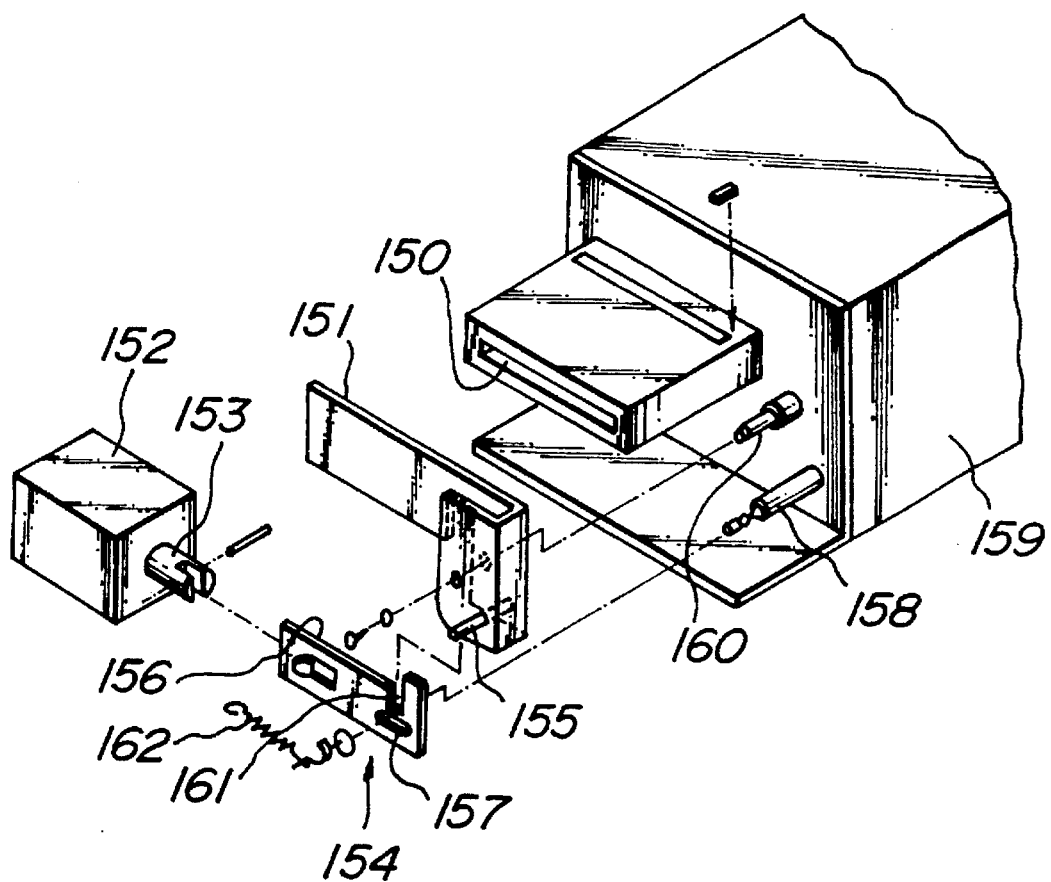
FIG_1
PRIOR ART

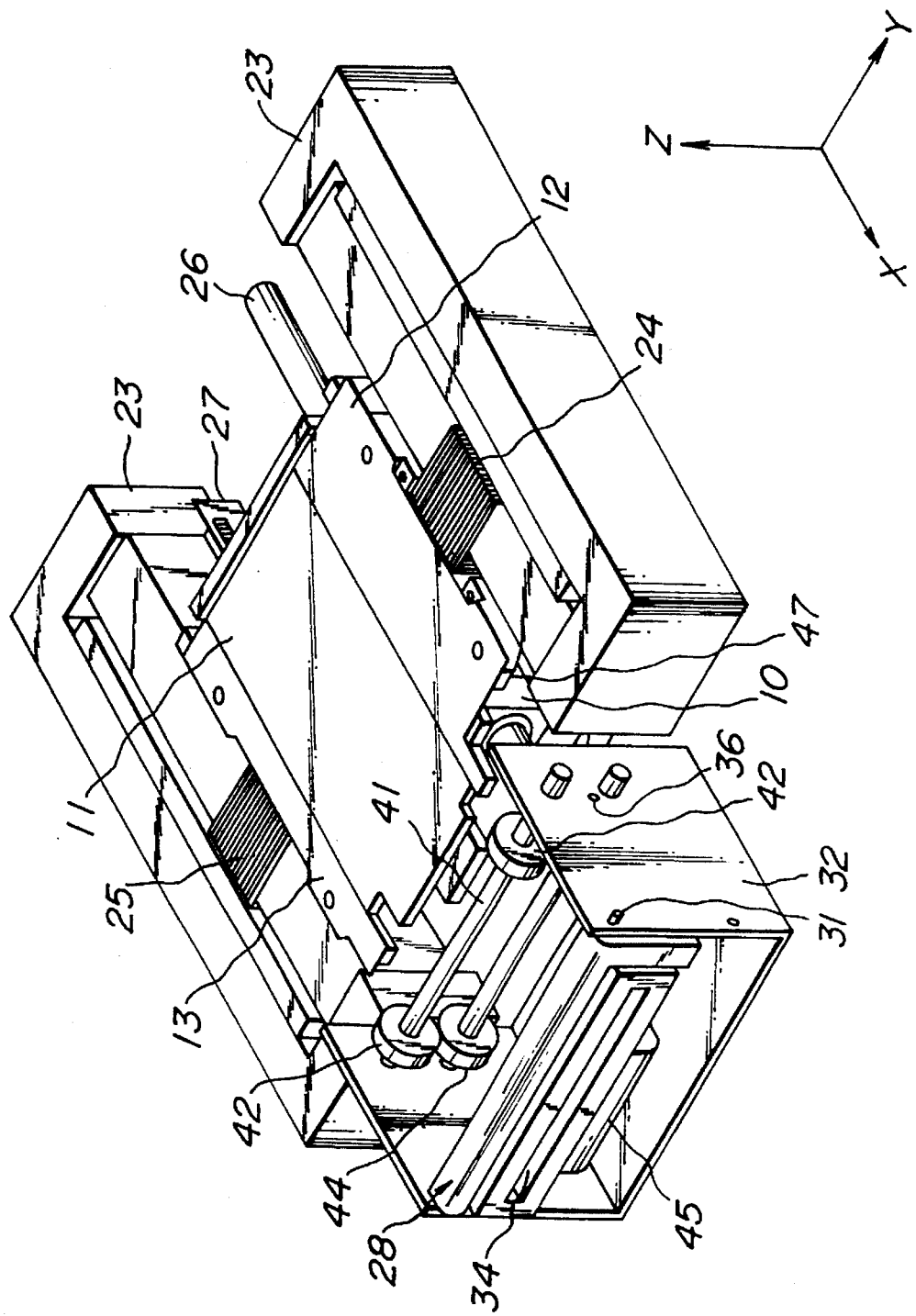

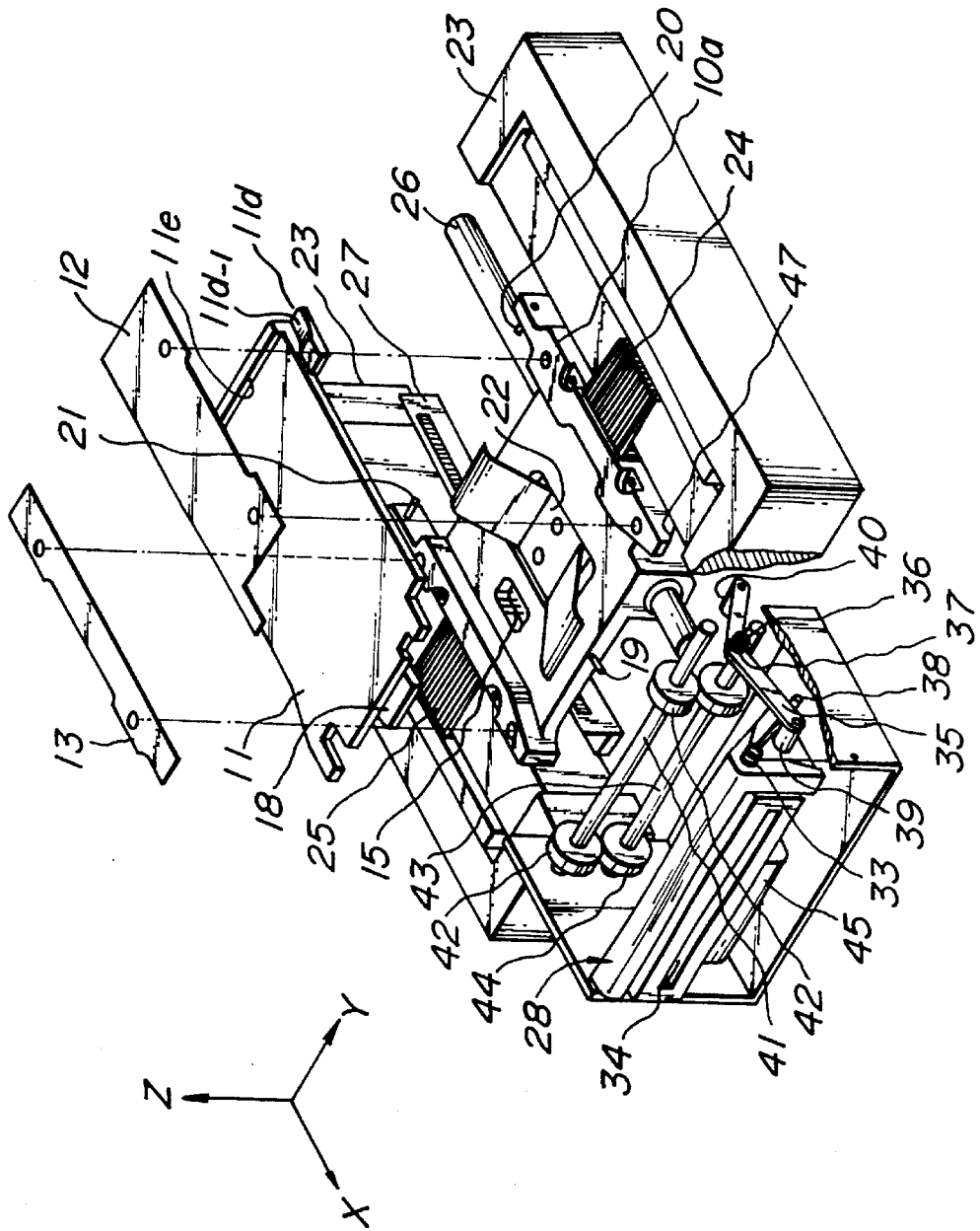
FIG._3

FIG_4
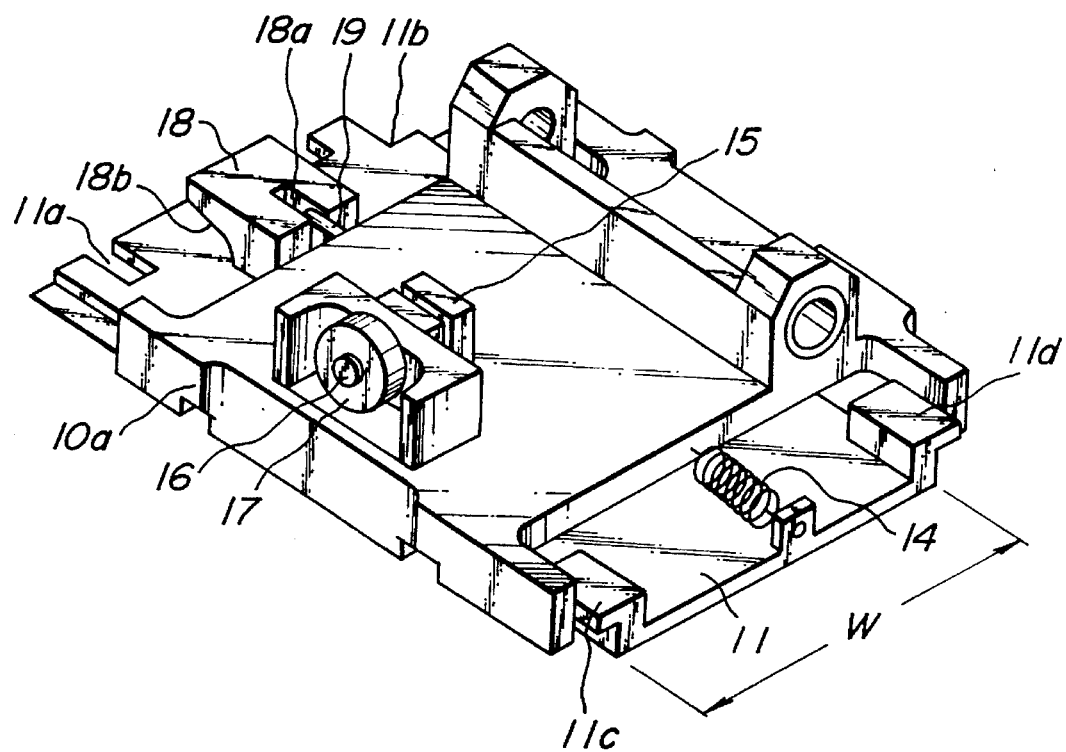

FIG_5
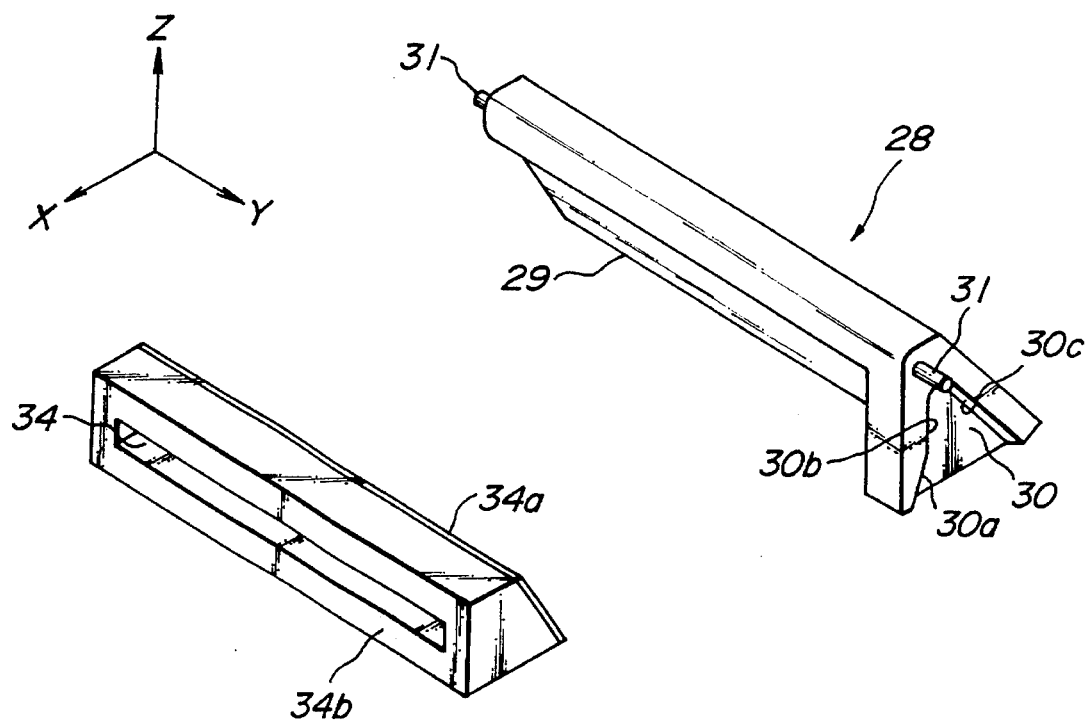

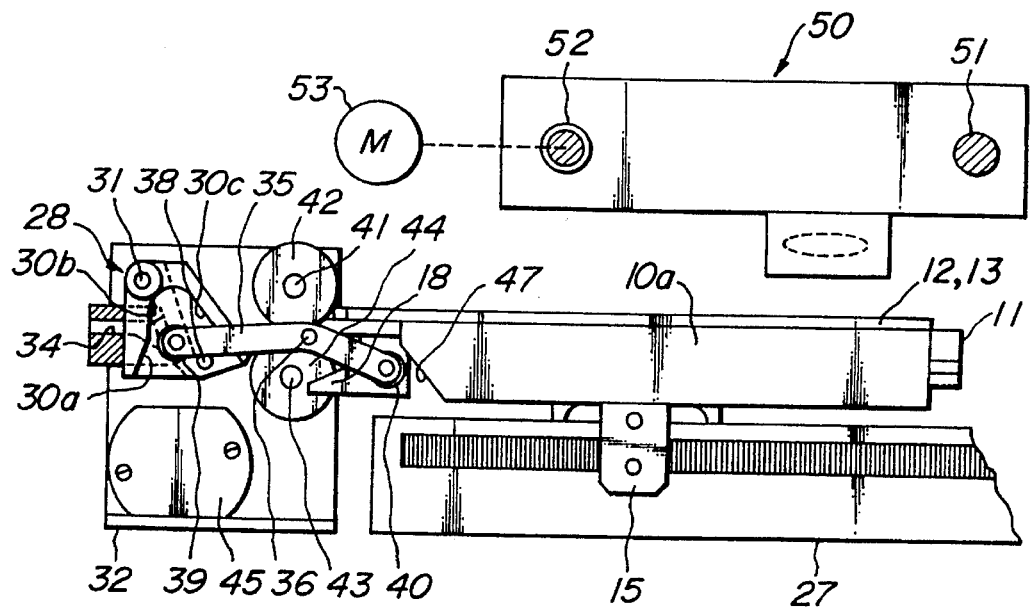
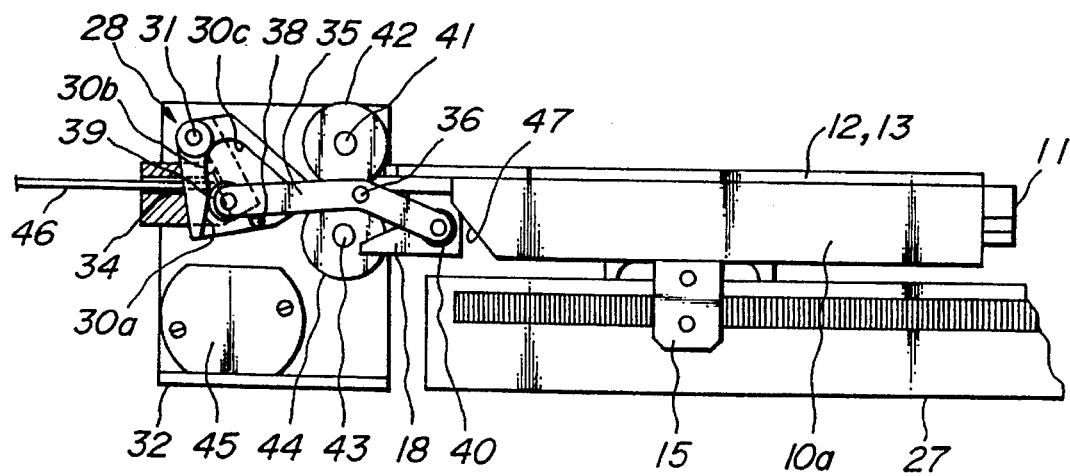

FIG_8
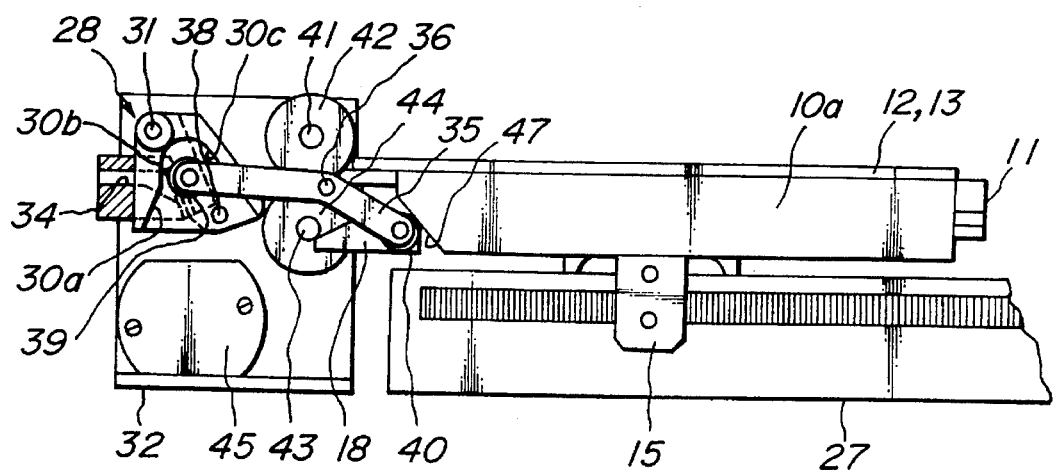
FIG_9
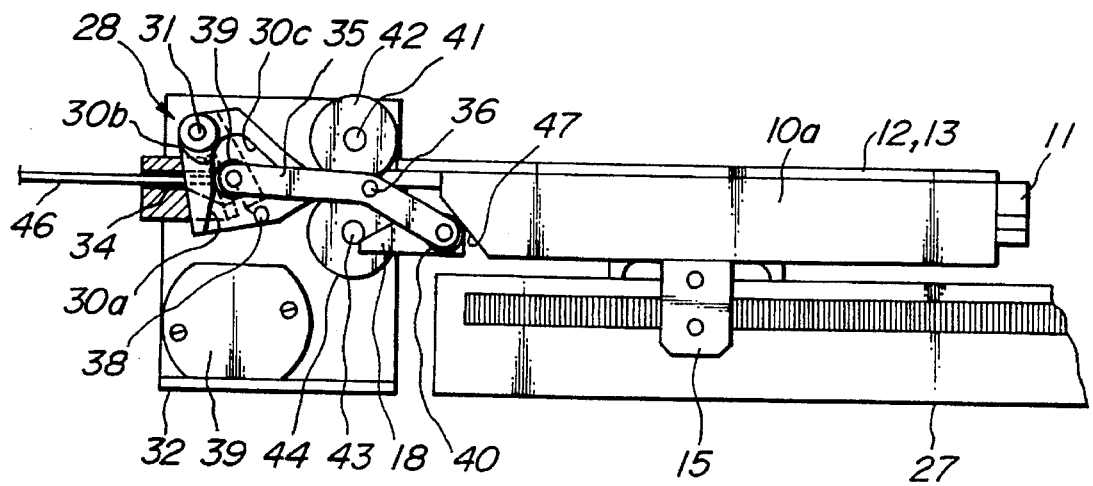

FIG_10
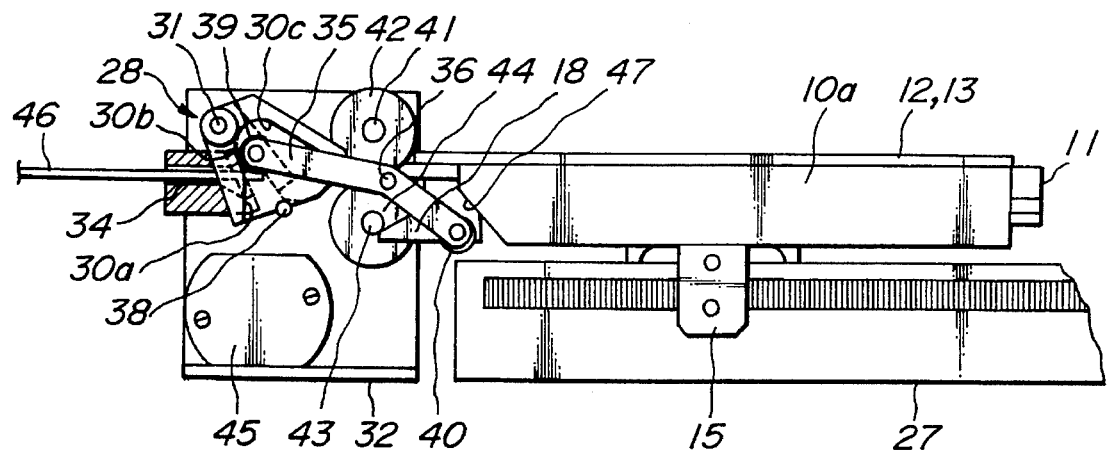
FIG_11
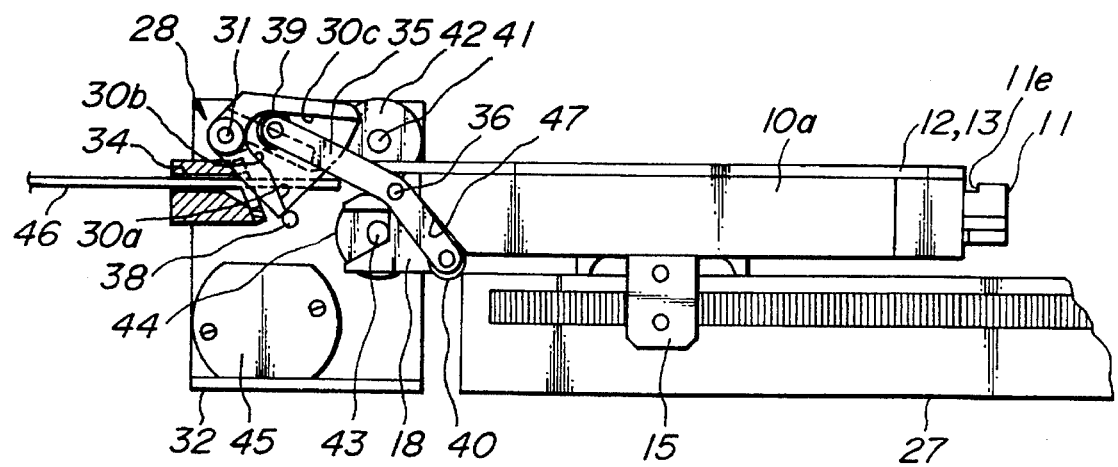

INFORMATION RECORDING AND/OR REPRODUCING APPARATUS WITH SHUTTER MEMBER AND SHUTTLE LINKED FOR MOVEMENT TOGETHER

BACKGROUND OF THE INVENTION

1. Field of the Invention

The present invention relates to an apparatus for recording and/or reproducing information on and/or from an information record medium, and more particularly to an apparatus for recording and/or reproducing information on and/or from an optical information recording card which is inserted into the apparatus.

2. Description of the Related Art

In the above mentioned apparatus for recording and/or reproducing information on and/or from a card-like optical information recording medium (hereinafter being termed as optical card), the optical card is inserted into the apparatus via a card insertion opening formed in a housing and is transported into a given position on a card supporting member called a shuttle by means of a loading mechanism, and then the card is moved relative to an optical head by moving the shuttle by means of a shuttle driving mechanism. After the information recording and/or reproduction, the optical card is transported in a reverse direction which is opposite to that for inserting the optical card and is discharged out of the housing via the card insertion opening. In order to avoid a double insertion of optical cards as well as to avoid intrusion of dust into the housing, the card insertion slot has to be closed. To this end, in the information recording and/or reproducing apparatus, there is provided a shutter near the card insertion slot, and the shutter is driven to open the card insertion slot only when the optical card is inserted into and is discharged from the housing via the card insertion slot.

In Japanese Utility Model Application Laid-open Publications Jikkai Hei 4-65 and 4-15757, there is described a shutter driving device, in which a shutter is driven in conjunction with a detecting member for detecting the information record card, said detecting member being urged against one side edge of the record card. In this shutter driving mechanism, as long as the record card is disposed within the housing, the shutter remains be closed, and therefore the double insertion of record card can be effectively prevented, but the intrusion of dusts can not be prevented effectively, because there is a space around the shutter for the card insertion slot. That is to say, in order to prevent the double insertion of the optical card, the card insertion opening is substantially opened.

In Japanese Utility Model Application Laid-open Publication Jikkai Sho 63-78361, there is disclosed another known apparatus, in which a detecting means for detecting the applicability of an record card is provided, and if it is confirmed that the record card is allowed to be used, a main shutter provided near the card insertion slot is opened, and a sub-shutter arranged in front of the main shutter is closed in response to the opening of the main shutter. However, this apparatus is liable to be complicated in construction and expensive in cost. Particularly, the record card detecting means requires a rather expensive photointerruptor for detecting the record card.

In Japanese Utility Model Publication Jikkou Sho 61-37103, there is described another known apparatus. FIG. 1 is an exploded perspective view showing this known apparatus. The apparatus comprises a card passage 150, a shutter 151 for selectively closing the card passage 150, a solenoid 152 having a plunger 153, and a connecting plate 154 secured to the plunger 153. The connecting plate 154 is movably secured to a housing 159 by means of a pin 160 and a slot 157, and a base portion of the shutter 151 is rotatably secured to the housing 159 by means of a pin 158. To the base portion of the shutter 151 is secured a pin 155 which is engaged with an upper edge 156 of the connecting plate 154, and a slit 161 is formed in the upper edge. When the solenoid 152 is not energized, the connecting plate 154 is in a right hand position in FIG. 1 due to a coiled spring 162 provided between the connecting plate 154 and the pin 158. In this condition, the pin 155 secured to the base portion of the shutter 151 is brought into contact with the upper edge 156 of the connecting plate 154, so that the shutter 151 closes the card passage 150. When the solenoid 152 is energized, the plunger 153 and thus the connecting plate 154 are moved leftward against the force of the coiled spring 162, and the pin 155 is inserted into the slit 161 formed in the connecting plate 154, so that the shutter 151 is rotated about the pin 160 in the clockwise direction to open the card passage 150.

Also, in this known apparatus, it is necessary to provide a circuit for driving the solenoid 152, and thus the apparatus is liable to be complicated in construction and expensive in cost. Moreover, a reliability of the apparatus is relatively low, because various parts cannot operate suitably for a long time.

SUMMARY OF THE INVENTION

The present invention has for its object to provide a novel and useful apparatus for recording and/or reproducing information on and/or from a record medium, in which the intrusion of dust can be effectively prevented by a shutter member, and a cost of the apparatus can be reduced and a reliability can be increased by not providing any record medium detecting means for driving the shutter member or any particular means for driving only the shutter member.

According to the invention, an apparatus for recording and/or reproducing information on and/or from a record medium comprises:

a record medium insertion opening through which a record medium is inserted into and removed from the apparatus;

a recording and/or reproducing head for recording and/or reproducing information on and/or from the record medium;

a supporting means for supporting the record medium and arranged movably in a first direction between a loading position and a recording and/or reproducing position;

a driving means for moving the supporting means in the first direction with respect to the head between the loading position and the recording and/or reproducing position;

a shutter member arranged movably between a first position in which the record medium insertion opening is closed by the shutter member and a second position at which the record medium insertion opening is not closed by the shutter member; and a link member having a first portion which is engaged with the supporting means when the supporting means is in the loading position and a second portion which is engaged with the shutter member when the first portion is engaged with the supporting means to move the shutter member into the second position to open the record medium insertion opening.

According to the invention, the shutter member is driven by the movement of the record medium supporting member, so that it is not necessary to provide a special means for driving the shutter member. Therefore, the apparatus can be constructed from a smaller number of parts and can be less expensive, and further, the apparatus can operate reliably for a long time.

BRIEF DESCRIPTION OF THE DRAWINGS

FIG. 1 is an exploded perspective view showing a known information recording and/or reproducing apparatus;

FIG. 2 is a perspective view illustrating an embodiment of the information recording and/or reproducing apparatus according to the invention;

FIG. 3 is an exploded perspective view of the apparatus shown in FIG. 2;

FIG. 4 is a perspective rear view depicting a shutter base;

FIG. 5 is a perspective view representing a card insertion slot and shutter member;

FIG. 6 is a side view showing the shuttle in a read/write region;

FIG. 7 is a side view illustrating the shuttle which is moving from the condition shown in FIG. 6 into a loading position;

FIG. 8 is a side view depicting the shuttle in the loading position;

FIG. 9 is a side view representing the shuttle onto which the record card is transported;

FIG. 10 is a side view illustrating the shuttle on which the record card has been just loaded and a shutter member is rotated; and FIG. 11 is a side view showing the shuttle in the loading position.

DESCRIPTION OF THE PREFERRED EMBODIMENTS

Now the present invention will be explained in detail with reference to the drawings which show an embodiment of the information recording and/or reproducing apparatus according to the invention, in which an optical card is used as the record medium. In FIG. 2, a reference numeral 10 denotes a card supporting member generally called a shuttle. As clearly shown in FIG. 4, the shuttle 10 is formed as a flat box and comprises a tray 11, a shuttle base 10a, upper metal plates 12 and 13 secured to the shuttle base 10a (see FIG. 3) and a coiled spring 14 provided between the shuttle base 10a and the tray 11 such that they can move relative to each other in a shuttle travelling direction X. It should be noted that the optical card includes a plurality of tracks which extend in the direction X.

The upper metal plates 12 and 13 are separated from each other in a direction Y perpendicular to the direction X such that a record area of a record card is not covered with the upper metal plates. As clearly shown in FIG. 4, on a lower surface of the shuttle base 10a, there are provided an encoder 15 and a roller 17 which is rotatably supported by a shaft 16.

On a front end wall of the tray 11 from which the record card is to be inserted, there is provided an engaging member 18 which comprises a slit 18a extending in the direction X as well as in a direction Z which is perpendicular both to the directions x and Y, and a curved surface 18b consisting of an inclined surface and an upright surface. Into the slit 18a there is inserted a pin 19 which is secured to a front side wall of the shuttle base 10a and extends in the direction X. In the front side wall of the tray 11, there are formed a pair of slits 11a and 11b which extend in the direction X. As can be understood later, these slits 11a and 11b serve to form spaces through which driving rollers for moving the optical card with respect to the shuttle 10 are exposed onto a front surface of the tray 11.

In a rear end wall of the tray 11, there are formed a pair of engaging portions 11c and 11d at opposite sides thereof. Each of these engaging portions 11c and 11d has a step in the direction Z, i.e. in a direction of a thickness of the optical card. The steps of the engaging portions 11c and 11d are engaged with pins 20 and 21, respectively which are secured to inner side walls of the shuttle base 10a and extend in the direction X, i.e. a direction of a width of the optical card. A distance W between upright surfaces of the engaging portions 11c and 11d is slightly smaller than a space between tips of the pins 20 and 21. Further, the engaging portions 11c and 11d serve as stoppers for the relative movement of the tray 11 and the shuttle base 10a in the direction X under the action of the coiled spring 14.

As shown in FIGS. 2 and 3, in a front end wall of a side portion of the shuttle base 10a, there is formed a slope 47. As will be explained later, the slope 47 is engaged with a roller 40 provided at one end of a lever 35 such that the lever is rotated by the engagement of the roller with the slope. As clearly shown in FIG. 3, on an upper surface of the shuttle base 10a, there is secured a pushing leaf spring 22 which pushes resiliently the tray 11 upward. Therefore, the tray 11 is urged against lower surfaces of the upper metal plates 12 and 13 and is slidable in the directions X and Z by means of a guide mechanism including the pins 19, 20 and 21. As will be understood hereinafter, when the shuttle 10 is not in a loading position or in a vicinity thereof, the tray 11 in such a position that the engaging portions 11c and 11d of the tray are urged against the rear end wall of the shuttle base 10a by means of the coiled spring 14 and the tray 11 is urged against the upper metal plates 12 and 13 by means of the leaf spring 22.

On both side walls of the shuttle base 10a, there are provided voice coils 24 and 25, respectively which form voice coil motors 23 for driving the shuttle 10 in the direction X. The shuttle base 10a has formed therein opening through which a guide shaft 26 is inserted, so that the shuttle 10 is supported movably in the direction X together with the roller 17 shown in FIG. 4. Near one of the voice coil motors 23, there is arranged a linear scale 27 having slits. The slits of the linear scale 27 are photoelectrically detected by the encoder 15, and the position and moving speed of the shuttle 10 are controlled in accordance with a signal generated by the encoder 15. In this manner, the shuttle 10 is moved by the voice coil motors 23 in a reciprocal manner in the direction X by means of the guide mechanism including the guide shaft 26 and roller 17 with respect to an optical head 50 shown only in FIG. 6.

FIG. 5 is a perspective view showing an inlet block 34b having a card insertion opening 34 formed therein and a shutter member 28. The shutter member 28 comprises a flap portion 30, a cam portion 29 and pins 31 provided on opposite side walls. As illustrated in FIG. 2, the shutter member 28 is swingably secured to a loading base 32 by means of the pins 31. That is to say, the shutter member 28 is swingable about an axis which extends in the direction Y. In the cam portion 30 there is formed a depressed portion to constitute first, second and third engaging portions 30a, 30b and 30c which are brought into contact with a roller 39 (FIG.

3). Between the shutter member 28 and the loading base 32, there is provided a coiled spring 33 as depicted in FIG. 3 such that the flap portion 29 of the shutter member 28 is biased to be resiliently urged against a rear surface of the inlet block 34b having the card insertion opening 34 formed therein. On the rear surface of the inlet block 34b there is applied a resilient sheet 34a made of rubber such as chloroplane rubber. Therefore, when the card insertion opening 34 is closed by the shutter member 28, the flap portion 29 of the shutter member 28 is brought into close contact with the rubber sheet 34a so that there is not formed a space therebetween and the intrusion of dust can be effectively prevented.

As shown in FIG. 3, on a side wall of the loading base 32 there is secured a dog-leg lever 35 which is rotatable about a pin 36. Between the lever 35 and the pin 36 there is arranged a coiled spring 37 such that the lever 35 is biased to be rotated in a counter-clockwise direction in FIG. 3 and a left hand end is urged against a stopper 38 secured on an inner wall of the loading base 32. To one end of the lever 35 is rotatably secured a first roller 39, and to the other end of the lever is rotatably secured a second roller 40. As stated above, the first roller 39 is engaged with the cam portion 30 having the engaging portions 30a, 30b and 30c of the shutter member 28, and the second roller 40 is engaged with the slope 47 formed in the shutter base 10a.

Next, a loading unit provided within the loading base 32 will be explained. As illustrated in FIG. 3, the loading unit comprises the card insertion opening 34, the shutter member 28 which selectively closes the card insertion opening, a shaft 41 extending in the direction Y, a pair of driving rubber rollers 42 arranged rotatably on the shaft 41, a shaft 43 extending in the direction Y, a pair of rubber rollers 44 arranged rotatably on the shaft 43 and brought into contact with the rollers 42, and a motor 45 for driving the shaft 41 by means of a gear train (not shown). The driven rollers 44 are made of a self-lubricating resin such as polyacetale and are arranged rotatably about the shaft 43, and thus, when the driving force of the rollers 42 is transmitted to the rollers 44 via the optical card, the shaft 43 is not rotated.

Now a card inserting operation for loading the optical card onto the shuttle 10 and a card discharging operation for ejecting the optical card from the shuttle 10 will be explained with further reference to FIGS. 6 to 11.

FIG. 6 is a side view of the apparatus under a condition in which the shuttle is in a read/write position. In FIG. 6, there is shown an optical head 50 arranged above the shuttle 10. As usual, the optical head 50 comprises light source formed by a laser diode, an objective lens for projecting a laser beam onto the optical card loaded on the shuttle and collecting laser light reflected by the optical card, a photodetector for receiving the laser light reflected by the optical card, and a focusing and tracking mechanism for moving the objective lens in focusing and tracking directions, The optical head 50 is arranged movably in the direction Y perpendicular to the direction X in which data tracks on the optical card extend. To this end, there are provided a guide shaft 51 and lead screw 52 which is rotated in a reciprocal manner by means of an electric motor 53 by means of a suitable mechanism. Since the optical head and its driving mechanism are well known in the art, they are not explained more in detail.

In the condition of FIG. 6, the tray 11 is pushed upward by means of the leaf spring 22, and an upper surface of a left hand portion of the tray 11 is resiliently urged against the lower surfaces of the upper metal plates 12 and 13. However, the engaging portions 11c and 11d of the tray 11 are engaged with the pins 20 and 21, respectively, so that an upper surface of a right hand portion of the tray 11 is separated from the lower surfaces of the upper metal plates 12 and 13 by a distance which is slightly smaller than a thickness of the optical card. Further, the dog-leg lever 35 is biased to rotate in the counter-clockwise direction and the left hand end of the lever is urged against the stopper 38. Therefore, if the optical card 46 is inserted into the card insertion opening 34 and the flap portion 29 of the shutter member 28 is pushed by a front end of the card as shown in FIG. 7, the shutter member cannot be rotated because the first engaging portion 30a formed in the cam portion 30 of the shutter member 28 is brought into contact with the roller 39. In this manner, when the shuttle 10 is in the read/write position, the flap portion 29 of the shutter member 28 is brought into contact with the resilient sheet 34a provided on the rear surface of the inlet block 34b and the card insertion opening 34 is effectively closed by the shutter member 28. Therefore, the double insertion of card and the intrusion of dust can be efficiently prevented.

FIG. 8 shows a condition in which the shuttle 10 is in a loading position. As compared with FIG. 6, the shuttle 10 is moved leftward. During the movement of the shuttle 10 from the read/write position shown in FIG. 6 into the loading position of FIG. 8, the slope 47 formed in the shuttle 10 is brought into contact with the second roller 40, so that the lever 35 is rotated in the clockwise direction against the force of the spring 37. In this condition, when the optical card 46 is inserted through the card insertion opening 34, the flap portion 29 of the shutter member 28 is pushed by the front end of the optical card, and the second engaging portion 30b of the cam portion 30 is brought into contact with the first roller 39, and thus, the lever 35 is further rotated in the clockwise direction. Therefore, the shutter member 28 is rotated in the counter-clockwise direction and the card insertion opening 34 is opened to allow the further insertion the optical card 46 as shown in FIG. 10. When the front end of the optical card 46 is detected by a sensor (not shown), the voice coil motors 23 are energized and the shuttle 10 is further moved in the left hand direction. This movement of the shuttle 10 is stopped when the shuttle is moved into the position shown in At the same time, the motor 45 is energized and the rollers 42 are rotated in the counter-clockwise direction. Due to the movement of the shuttle 10 from the position shown in FIG. 10 into the position of FIG. 11, the slope 47 of the shuttle base 10a is brought into contact again with the second roller 40, and the lever 35 is further rotated in the clockwise direction against the force of the spring 37. At the same time, the engaging portion 18 provided on the tray 11 is brought into contact with the shaft 43, so that the left hand portion of the tray is pushed down. After the movement of the tray 11 in the direction X has been stopped due to the engagement of the engaging portion 18 with the shaft 43, the shuttle base 10a is further moved in the left hand direction against the force of the spring 14. Then, the right hand end portion of the tray 11 is moved downward against the force of the leaf spring 22 due to the engagement of the slopes 11d–1 of the engaging portions 11c and 11d with the pins 20 and 21, respectively. In this manner, the tray 11 is separated from the upper metal plates 12 and 13 by a distance which is slightly larger than a thickness of the optical card 46. That is to say, in the condition illustrated in FIG. 11, the optical card 46 can be smoothly inserted onto the tray 11 without being affected by the shutter member 28 and the upper metal plates 12 and 13. When the front end of the optical card 46 is clamped between the rollers 42 and 44, the optical card is automatically fed onto the tray 11 of the shuttle 10. After the front edge of the optical card 46 has been brought into contact with a step 11e formed in the right hand end of the tray 11, the motor 45 is still energized, and the tray 11 is moved in the right hand direction against the force of the spring 14 by means of the optical card 46. This movement of the tray 11 is stopped by the engagement of the pin 19 with a front wall of the slit 18a shown in FIG. 4. In this condition, the rollers 42 slip on the optical card 46. After that, the voice coil motors 23 are energized to move the shuttle 10 in the right hand direction, and after the short movement of the shuttle base 10a, the tray 11 is moved in the right hand direction together with the shuttle base 10a, and the optical card 46 is released from the rollers 42 and 44. During the first movement of the shuttle base 10a in the right hand direction, the lever 35 is rotated in the clockwise direction, and the card insertion opening 34 is closed by the shutter member 28. Further, when the tray 11 is moved in the right hand direction, the tray is moved upward, so that the optical card 46 is firmly clamped between the tray and the upper metal plates 12 and 13. In this manner, the optical card 46 is placed in a given position on the shuttle 10.

As explained above, according to the invention, the lever 35 and first and second rollers 39 and 40 constitute a link member for moving the shutter member 28 in conjunction with the movement of the shuttle 10.

Next, the operation for ejecting the optical card 46 from the shuttle 10 will be explained. During the movement of the shuttle 10 from the position shown in FIG. 8 into the position illustrated in FIG. 11, the slope 47 of the shuttle base 10a is always brought into contact with the second roller 40, and the lever 35 is rotated in the clockwise direction against the force of the spring 37 into the position shown in FIG. 11. Due to this rotation of the lever 35, the first roller 39 is brought into contact with the engaging portions 30a, 30b and 30c, and the shutter member 28 is rotated against the force of the spring 33 into the position shown in FIG. 11. When the shuttle 10 is moved into the loading position shown in FIG. 11, the left hand end of the optical card 46 is clamped between the rollers 42 and 44, so that the optical card 46 is fed in the left hand direction and is discharged from the tray 11. It should be noted that when the shuttle 10 is in the loading position, the tray is moved downward to release the optical card. In the ejecting operation, the optical card 46 is discharged without being brought into contact with the shutter member 28.

The present invention is not limited to the embodiment explained above, but many modifications and alterations may be conceived by those skilled in the art within the scope of the invention. In the above mentioned embodiment, the front end of the optical card is detected by the sensor to move the shuttle, This may be carried out by detecting the rotation of the shutter member. Further, the slope 47 may be formed on the side wall or upper surface of the shuttle base 10a. Moreover, the rotating direction of the shutter member may be reversed, and the link member including the lever 35 may be formed as a two-step link. The shuttle is driven by the voice coil motors 23, but may be moved by other driving means such as a linear stepping motor. Furthermore, the shuttle may be driven by a usual rotational motor by means of a belt or wire.

In the information recording and/or reproducing apparatus according to the invention, the shutter member is moved by means of the driving means for moving the shuttle, and thus, it is no longer necessary to provide a special driving means for driving only the shutter. Therefore, the construction of the apparatus becomes simple, a cost of the apparatus can be reduced and a reliability of the apparatus can be improved. Further, the shutter member is brought into contact with the surface of the block having the record medium insertion opening formed therein via the resilient sheet, so that the opening can be closed in an air tight manner and the intrusion of dust can be effectively prevented.

What is claimed is:

1. An apparatus for recording and/or reproducing information on and/or from a record medium comprising:

a record medium insertion opening through which a record medium is inserted into and removed from the apparatus;

a recording and/or reproducing head for recording and/or reproducing information on and/or from the record medium;

a supporting means for supporting the record medium and arranged movably in a first direction between a loading position and a recording and/or reproducing position, said loading position being a position at which said record medium is inserted into said record medium insertion opening or is discharged from said record medium insertion opening;

a driving means for moving said supporting means in the first direction with respect to the head between said loading position and said recording and/or reproducing position;

a shutter member arranged movably between a first position in which the record medium insertion opening is closed by the shutter member and a second position at which said record medium insertion opening is not closed by said shutter member; and a link member having a first portion which is engaged with said supporting means when the supporting means is in said loading position and a second portion which is engaged with said shutter member when said first portion is engaged with the supporting means to move the shutter member into said second position to open the record medium insertion opening;

wherein the link member comprises a lever arranged move between a first position and a second position, a first roller arranged at one end of the lever such that the first roller is brought into contact with said supporting means in said loading position and the lever is moved into the second position, and a second roller arranged at the other end of the lever, and said shutter member comprises a flap portion which closes said record medium inserting opening, and a cam portion having first and second engaging portions which are engaged with said second roller such that when said supporting means is in said recording and/or reproducing position and said lever is in said first position, the first engaging portion of the cam portion is engaged with the second roller to close the record medium insertion opening by the flap portion and when said supporting means is in said loading position and said lever is moved into said second position by an engagement of the supporting means with the first roller, said second portion of the cam portion is engaged with the second roller to open the record medium insertion opening.

2. An apparatus according to claim 1, wherein said cam portion of the shutter member further comprises a third engaging portion which is engaged with said second roller when the record medium is inserted into the record medium insertion opening under a condition that the supporting means is in the loading position and the lever is moved into the second position to allow the insertion of the record medium.

3. An apparatus according to claim 1, wherein said supporting means comprises a shuttle base which is moved by said driving means in the first direction, a tray arranged on the shuttle base movably in the first direction with respect to the shuttle base as well as in a second direction which is perpendicular to a surface of the record medium and plate members secured to said shuttle base, and when the supporting means is in said loading position, the shuttle base is further moved in the first direction with respect to the tray to move the tray in said second direction to form a space between said tray and the plate members, said space being larger than a thickness of the record medium, said second roller is engaged with said second engaging portion of the cam portion to move the shutter member into the second position, and when the shuttle base is returned into the initial loading position, the record medium is clamped between the tray and the plate members.

4. An apparatus according to claim 3, wherein the apparatus further comprises a second driving means for moving the record medium into and from the supporting means and a sensor for detecting a front edge of the record medium, and when the front edge of the record medium is detected by the sensor, said driving means is driven to move the shuttle base in the loading position in the first direction toward the record medium insertion opening.

5. An apparatus according to claim 4, wherein said shutter member is arranged rotatably about an axis which extends in a direction perpendicular both to the first and second directions.

* * * * *